(12) United States Patent
Shem Tov et al.

(10) Patent No.: US 9,712,563 B2
(45) Date of Patent: Jul. 18, 2017

(54) CONNECTION-SPECIFIC COMMUNICATION MANAGEMENT

(71) Applicant: Cyber-Ark Software Ltd., Petach-Tikva (IL)

(72) Inventors: Doron Shem Tov, Bat-Yam (IL); Yair Sade, Herzlia (IL); Shlomy Marom, Holon (IL); Millie Richter, Petach-Tikva (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 0 days.

(21) Appl. No.: 14/792,828

(22) Filed: Jul. 7, 2015

(65) Prior Publication Data

US 2016/0006765 A1 Jan. 7, 2016

Related U.S. Application Data

(63) Continuation-in-part of application No. 14/479,498, filed on Sep. 8, 2014.

(60) Provisional application No. 62/021,234, filed on Jul. 7, 2014.

(51) Int. Cl.
*H04L 29/06* (2006.01)
*G06Q 10/06* (2012.01)

(52) U.S. Cl.
CPC ............. *H04L 63/20* (2013.01); *G06Q 10/06* (2013.01); *H04L 63/08* (2013.01)

(58) Field of Classification Search
CPC .......... H04L 63/20; H04L 63/08; G06Q 10/06
USPC .......................................................... 726/1
See application file for complete search history.

(56) References Cited

U.S. PATENT DOCUMENTS

| 6,285,680 | B1 * | 9/2001 | Steinka ............... H04L 12/2856 370/352 |
| 6,286,104 | B1 | 9/2001 | Buhle et al. |
| 6,986,040 | B1 | 1/2006 | Kramer et al. |
| 7,187,678 | B2 * | 3/2007 | Cunetto .............. H04L 12/2856 370/395.2 |
| 7,961,736 | B2 * | 6/2011 | Ayyagari ................ H04L 29/06 370/395.3 |
| 8,499,147 | B2 | 7/2013 | Ikeda et al. |

(Continued)

FOREIGN PATENT DOCUMENTS

| WO | WO 00/51031 | 9/2000 |
| WO | WO 2013/088212 | 6/2013 |
| WO | WO 2014/064686 | 5/2014 |

OTHER PUBLICATIONS

European Search Report and the European Search Opinion Dated Nov. 6, 2015 From the European Patent Office Re. Application No. 15173242.7.

(Continued)

*Primary Examiner* — Mahfuzur Rahman

(57) ABSTRACT

A method of managing a connection-specific policy for accessing a target system includes receiving a request from a user client for a connection with a target system. A unique identifier is determined for the requested connection. Connection settings for connecting to the target system are provided to the user client. The connection settings include the unique connection identifier. A corresponding access policy for the connection identifier is provided to the target system. The target system applies the corresponding access policy on the connection established with the connection settings.

26 Claims, 3 Drawing Sheets

(56) References Cited

U.S. PATENT DOCUMENTS

| | | | |
|---|---|---|---|
| 9,130,935 | B2 | 9/2015 | Somani et al. |
| 9,282,097 | B2 | 3/2016 | Agarwal et al. |
| 2005/0129026 | A1* | 6/2005 | Chang ............... H04L 29/06027 370/395.2 |
| 2006/0101510 | A1 | 5/2006 | Kadyk et al. |
| 2006/0225132 | A1 | 10/2006 | Swift et al. |
| 2008/0056286 | A1* | 3/2008 | Forssell ................ H04W 48/18 370/401 |
| 2008/0196101 | A1 | 8/2008 | Sade et al. |
| 2011/0231651 | A1 | 9/2011 | Bollay |
| 2011/0277016 | A1 | 11/2011 | Hockings et al. |
| 2011/0321120 | A1 | 12/2011 | Saxena et al. |
| 2012/0072592 | A1* | 3/2012 | Lidstrom ............ H04L 12/5695 709/224 |
| 2012/0124205 | A1 | 5/2012 | Muret et al. |
| 2012/0284786 | A1 | 11/2012 | Somani et al. |
| 2013/0191631 | A1 | 7/2013 | Ylonen et al. |
| 2014/0181939 | A1 | 6/2014 | Bonnell |
| 2014/0365653 | A1* | 12/2014 | Matoba ................... H04L 63/10 709/225 |
| 2015/0082396 | A1 | 3/2015 | Theebaprakasam et al. |
| 2015/0200821 | A1 | 7/2015 | Sade et al. |
| 2015/0222604 | A1 | 8/2015 | Ylonen |
| 2015/0271162 | A1 | 9/2015 | Dulkin et al. |
| 2015/0326435 | A1* | 11/2015 | Tamura ............... H04L 41/0803 709/221 |
| 2016/0006712 | A1 | 1/2016 | Sade et al. |
| 2016/0142914 | A1* | 5/2016 | He .......................... H04L 67/34 726/12 |
| 2016/0198403 | A1* | 7/2016 | Sumiuchi .............. H04W 48/16 455/434 |

OTHER PUBLICATIONS

Official Action Dated Nov. 6, 2015 From the US Patent and Trademark Office Re. U.S. Appl. No. 14/217,649.
Applicant-Initiated Interview Summary Dated Feb. 23, 2016 From the US Patent and Trademark Office Re. U.S. Appl. No. 14/217,649.
Official Action Dated Feb. 1, 2016 From the US Patent and Trademark Office Re. U.S. Appl. No. 14/154,200.
Hitachi Privileged-Access-Management, Hitachi ID Systems, Inc., 2 Pages, 2016.
Applicant-Initiated Interview Summary Dated Apr. 18, 2016 From the US Patent and Trademark Office Re. U.S. Appl. No. 14/154,200.
Official Action Dated May 13, 2016 From the US Patent and Trademark Office Re. U.S. Appl. No. 14/217,649.
Wikipedia "Processor", From Wikipedia, The Free Encyclopedia, 2.P, May 7, 2016.
Official Action Dated Jun. 6, 2016 From the US Patent and Trademark Office Re. U.S. Appl. No. 14/479,498.
Hitachi "Best Practices for Securing Privileged Accounts", Hitachi ID Systems Inc., p. 1-39, Mar. 2, 2011.
Hitachi "Securing Priviledged Accounts with Hitachi ID Privileged Access Manager", Hitachi ID Systems Inc., p. 1-18, Mar. 2, 2011.
Applicant-Initiated Interview Summary Dated Jun. 10, 2015 From the US Patent and Trademark Office Re. U.S. Appl. No. 14/217,649.
European Search Report and the European Search Opinion Dated May 15, 2015 From the European Patent Office Re. Application No. 15150412.3.
Official Action Dated Jun. 17, 2015 From the US Patent and Trademark Office Re. U.S. Appl. No. 14/217,649.
Official Action Dated Feb. 26, 2015 From the US Patent and Trademark Office Re. U.S. Appl. No. 14/217,649.
Centrify Corporation "Centrify Server Suite: Unified identity Management and Audit Across On-Premise and Cloud-Based Windows, Linux, and UNIX Servers", Data Sheet, Centrify Corporation, 2 P., 2014.
Citrix "Citrix XenServer. Industry-Leading Open Source Platform for Cost-Effective Cloud, Server and Desktop Virtualization", Citrix Systems Inc., Product Overview, 7 P., 2013.
Citrix "XenApp Smart Auditor", Citrix eDocs, Jan. 23, 2014.
CyberArk "Discovery & Audit", CyberArk DNA, Product Discription Brochure, Cyber-Ark Software Company, 2 P., Nov. 2013.
CyberArk "Privileged Identity Management Suite 7.0", Cyber-Ark Software, Ltd., Version 7.2, 4 P., Aug. 23, 2013.
CyberArk "Privileged Threat Analytics™", CyberArk Software Ltd., 2 P., 2013.
Cyber-Ark "Application Identity Manager™", Cyber Ark Software, Ltd., Datasheet, 2 P.
Cyber-Ark "Application Password Management", Cyber-Ark Software Ltd., Datasheet, 2 P., Feb. 2007.
Cyber-Ark "Enterprise Password Vault™ 4.5", Cyber-Ark Software Ltd., Brochure, 4 P., Nov. 2007.
Cyber-Ark "On-Demand Privileges Manager™ for Unix/Linux", Cyber Ark Software, Ltd., Datasheet, 2 P.
Cyber-Ark "On-Demand Privileges Manager™ for Windows", Cyber Ark Software, Ltd., Datasheet, 2 P., 2009.
Cyber-Ark "On-Demand Privileges Manager™", Cyber-Ark Software Ltd., Brochure, 2 P., Apr. 2010.
Cyber-Ark "Privileged Identity Management 5.0", Cyber-Ark Software Ltd., Brochure, 4 P., Apr. 2009.
Cyber-Ark "Privileged Identity Management Suite 7.0", Cyber-Ark Software, Ltd., PIM Brochure, 4 P., 2010.
Cyber-Ark "Privileged Session Management Suite 7.0", Cyber Ark Software, Ltd., PSM Brochure, 4 P., 2010.
Cyber-Ark "Privileged Session Manager™", Cyber-Ark Software Ltd., Datasheet, 2 P., Mar. 2009.
Gartner PAM "Beyondtrust: PowerBroker Identity Services for Active Directory Bridging. Extend Microsoft® Active Directory Authentication and Single-On Capabilities + Group Policy Configuration Management to UNIX, Linux and Mac Systems", Whitepaper, Gartner PAM Market Guide, 2 P., 2014.
Khan et al. "Oracle® Identity Manager: Connector Guide for UNIX, Release 11.1.1, E17694-06", Oracle, 128 P., Feb. 2014.
Observelt "Are You Monitoring Your Fastest Growing Threat? User-Based Threats: Identifying Suspicious Activities and Understanding Intent", Observelt, Overview Brochure, 2 P., Jan. 26, 2015.
Observelt "ObserveIT Enterprise User Activity Monitoring", Observelt, Product Documentation, Version 5.6.8, Jan. 23, 2014.
Oracle "Oracle Identity Manager 11g", Data Sheet, Oracle, 3 P., 2011.
Wikipedia "Remote Desktop Protocol", Wikipedia, the Free Encyclopedia, 7 P., Last Modified Sep. 16, 2014.
Applicant-Initiated Interview Summary Dated Nov. 17, 2016 From the US Patent and Trademark Office Re. U.S. Appl. No. 14/217,649. (4 pages).
Advisory Action Before the Filing of an Appeal Brief Dated Jul. 22, 2016 From the US Patent and Trademark Office Re. U.S. Appl. No. 14/217,649.
Official Action Dated Sep. 21, 2016 From the US Patent and Trademark Office Re. U.S. Appl. No. 14/217,649.
Applicant-Initiated Interview Summary Dated Sep. 30, 2016 From the US Patent and Trademark Office Re. U.S. Appl. No. 14/479,498.

* cited by examiner

CONNECTION-SPECIFIC COMMUNICATION MANAGEMENT

RELATED APPLICATIONS

This application is a Continuation-in-Part (CIP) of U.S. patent application Ser. No. 14/479,498 filed on Sep. 8, 2014, which claims the benefit of priority under 35 USC §119(e) of U.S. Provisional Patent Application No. 62/021,234 filed on Jul. 7, 2014. The contents of the above applications are all incorporated by reference as if fully set forth herein in their entirety.

FIELD AND BACKGROUND OF THE INVENTION

The present invention, in some embodiments thereof, relates to managing connections to target systems, and, more particularly, but not exclusively, to managing connections to target systems on a per connection basis.

Current schemes for managing user access to targets typically are implemented in a global manner. The access policies are applied to the target system, to a user or group of users. For example, the remote desk protocol (RDP) enables a user client to redirect resources such as clipboard, local drives and printers to the target server. If the administrator does not want the user to have these abilities, the administrator may configure the target server to prevent these actions. However, the limitations will apply to all the RDP connections to the machine. Thus in order to prevent clipboard redirection to a target machine by a specific user, the administrator needs to prevent clipboard redirection from all the users that connects to that target machine via RDP.

Current solutions to the problem include:

1) Signing the RDP file in order to protect against the connection settings tampering—In a typical Remote Desktop Web Access implementation, the web server provides an RDP file to the client so the user may establish a remote desktop connection to a remote server. The RDP file contains a collection of settings that will be sent later to the remote server. In order for the client to determine the legitimacy of the RDP file content sent by the web server, the web server adds a digital signature to the RDP file. The client verifies the content of the RDP file using the digital signature. The client may remove the digital signature from the RDP file and tamper with its contents. This approach mainly protects the user client.

2) Configuring a policy over the RDP server—The administrator configures a policy that is enforced using specific connection settings. The policy may be local (apply to a specific machine) or be for the entire domain. In both approaches, the policy applies to all the connections.

SUMMARY OF THE INVENTION

Embodiments of the invention enable a target system to apply an access policy on a connection-specific basis. When a user client requests connection settings for a target system, a policy controller assigns a connection identifier (ID) to the connection and provides connection settings which include the connection ID to the user client. The policy controller also determines the access policy which should be applied to the connection. The connection ID is a unique identifier which can be generated only by the policy controller and is identifiable by the target system as valid by any means known in the art.

The access policy specifies policy settings that are defined per user client connection with a target system. The policy settings are typically in the form of a set of rules and parameters, such as permission access parameters, connection properties, and other parameters, and are defined per connection to a target system.

The user client provides this connection ID to the target system when initiating the connection. The target system uses the connection ID to identify the access policy assigned to the connection by the policy controller. After identifying the access policy, the target system applies the policy over the specific connection with the user client and controls access to the target system accordingly.

Since the access policy is assigned separately for each connection, a different policy may be applied by the target system to a second connection, even if the second connection is established with the same protocol as the first connection or is a second connection between the same user client and the target system.

According to an aspect of some embodiments of the present invention there is provided a method of managing a connection-specific policy for accessing a target system. The method includes performing the following at a policy controller: receiving a request from a user client for a connection with a target system, determining a unique connection identifier respective for the connection, providing the user client with connection settings for connecting with the target system and providing the target system with a corresponding access policy for the connection identifier. The connection settings include the unique connection identifier. The method enables the target system to apply the corresponding access policy on the connection.

According to some embodiments of the invention, the access policy specifies connection parameters for the connection.

According to some embodiments of the invention, the access policy specifies operation parameters for the target system.

According to some embodiments of the invention, access policies are predefined on the target system, and providing the access policy comprises identifying to the target system an access policy associated with the connection identifier.

According to some embodiments of the invention, providing the access policy includes sending the corresponding access policy to the target system. According to additional or alternative embodiments of the invention, the method further includes:

receiving a request for an access policy corresponding to a specified connection identifier from a target system and sending the corresponding access policy to the target system.

According to some embodiments of the invention, the access policy is associated with the connection identifier in response to the request for an access policy.

According to some embodiments of the invention, the method further includes selecting an alternate target system for the connection and providing connection settings to connect the user client to the alternate target system.

According to some embodiments of the invention, the connection settings specify a routing of the connection established with the connection identifier.

According to an aspect of some embodiments of the present invention there is provided a method of applying a connection-specific policy by a target system. The method includes performing the following at a target system: receiving requests for connections from user clients, where each of the requests specifies a connection identifier issued to the user client by a policy controller and unique to the request;

for each of the requests for connections, determining from the respective connection identifier a corresponding access policy provided for a connection by the policy controller; and applying the corresponding access policy on the connection.

According to some embodiments of the invention, applying the corresponding access policy on the connection includes controlling the connection according to the corresponding access policy.

According to some embodiments of the invention, the access policy specifies connection parameters for the connection.

According to some embodiments of the invention, the access policy specifies operation parameters for the target system.

According to some embodiments of the invention, the method further includes receiving an access policy from the policy controller, the access policy specifying the connection identifier.

According to some embodiments of the invention, the method further includes: sending a request to the policy controller for an access policy for the connection identifier and receiving the access policy from the policy controller.

According to some embodiments of the invention, the method further includes modifying the access policy during the connection with the user client.

According to an aspect of some embodiments of the present invention there is provided a policy controller for managing a connection-specific access policy. The policy controller includes an interface adapted to receive user client requests to connect to target services and a processing unit connected to the interface. The processing unit: receives a request from a user client for a connection with a target system, determines a unique connection identifier for the connection, provides the user client with connection settings for connecting with the target system, and provides a corresponding access policy for the connection identifier to the target system. The connection settings include the unique connection identifier, thereby enabling the target system to apply the corresponding access policy on a connection established for the request.

According to some embodiments of the invention, the access policy specifies at least one of: connection parameters for the connection and operation parameters for the target system.

According to some embodiments of the invention, the processor is further configured to send the corresponding access policy to the target system.

According to some embodiments of the invention, processor is further configured to receive from a target system an access policy request which includes the connection identifier, and to return the target system an access policy associated with the connection identifier.

According to some embodiments of the invention, the processor is further configured to select an alternate target system for the connection and send the user client connections settings to the alternate target system.

According to some embodiments of the invention, the connection settings specify a routing of a connection established with the connection identifier.

According to some embodiments of the invention, the policy controller resides on a server functioning as a proxy between the user client and target system. In alternate embodiments, the policy controller resides on a machine on which the user client resides. In further alternate embodiments, the policy controller resides on the target system.

According to some embodiments of the invention, the processor is further configured to authenticate the user client request with a privileged account management system (PAMS).

According to an aspect of some embodiments of the present invention there is provided a target system with connection-specific access policies. The target system includes an interface adapted to receive user client requests to connect to target services and a processing unit connected to the interface. Each of the requests for connections specifies a connection identifier issued to the user client by a policy controller and unique to the request. The processing unit: determines, from the connection identifier, a corresponding access policy provided for a connection by the policy controller and applies the corresponding access policy on the connection.

According to some embodiments of the invention, the processor is configured to control the connection according to the corresponding access policy.

According to some embodiments of the invention, the processor is further configured to: request an access policy from a policy controller for the connection identifier, and receive the access policy from the policy controller.

According to some embodiments of the invention, the processor is further configured to modify the access policy during the connection with the user client.

According to some embodiments of the invention, the target system resides on a proxy server connecting between the user client and a destination device, and the target system applies the access policy on a connection between the user client and the destination device.

According to some embodiments of the invention, the processor is further configured to authenticate the connection identifier with policy controller.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of computer-readable instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
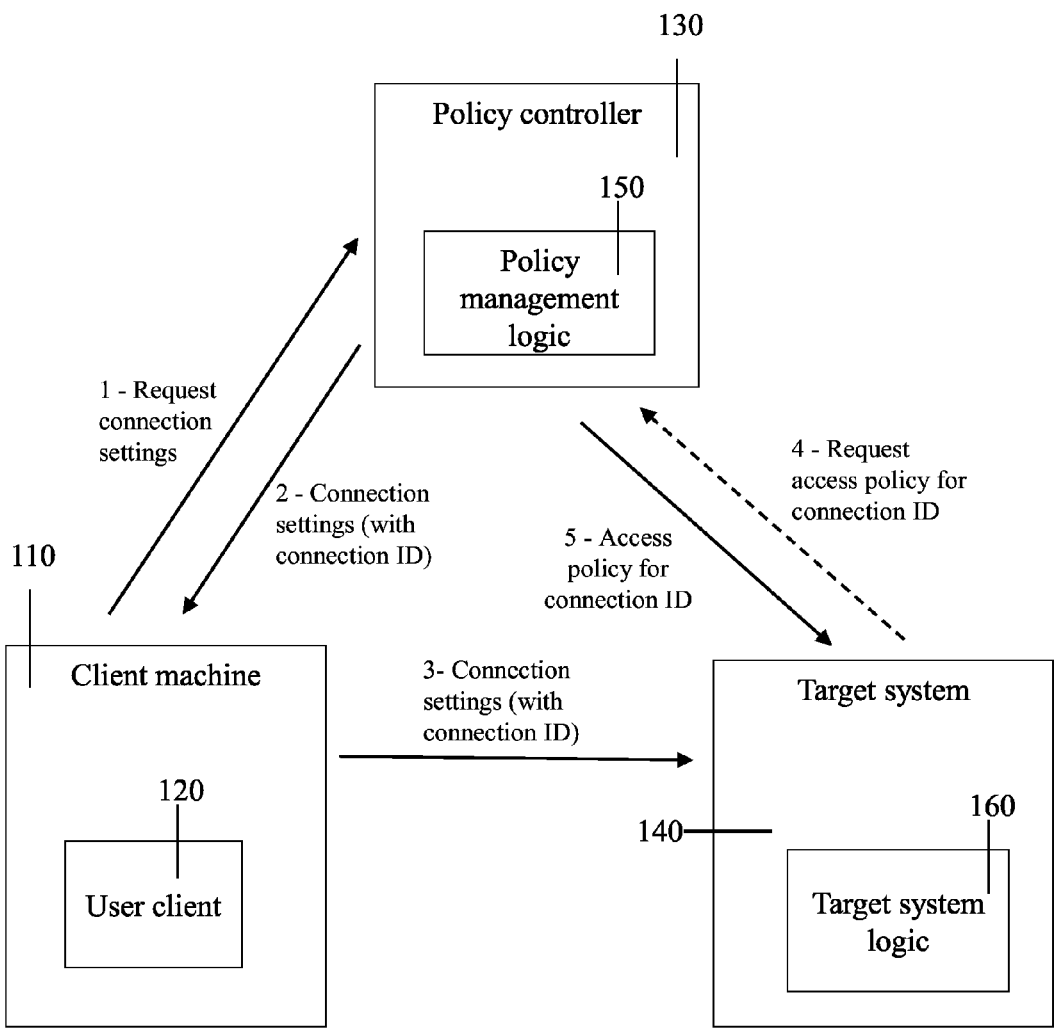
FIG. 1 is a simplified network diagram illustrating communication between a user client, policy controller and target system, according to embodiments of the invention.

The present invention, in some embodiments thereof, relates to managing connections to target systems, and, more particularly, but not exclusively, to managing connections to target systems on a per connection basis.

According to embodiments of the invention, a policy controller communicates with user clients running on end users' machines. The policy controller assigns access policies on a per connection basis. The access policies are used to control connections between target systems and user clients.

In order to establish a connection with a target system, a user client requests connection settings from the policy controller.

The policy controller provides connection settings which include a connection ID to the user client. The connection ID is unique to the specific connection. Connection IDs are valid for a single connection and cannot be reused to establish a second connection.

The user uses the connection settings to establish a connection with the target system. Optionally, the connection settings include only the connection ID. Alternately, the connection settings include additional settings and/or data provided by the policy controller. For example, the connection settings may include information needed to establish the communication session with the target system, such as the target system address, the communication protocol to be used, the supported encryption key for the connection, and so on.

The user client includes the connection ID in the connection request made to the target system. The target system uses the connection ID to identify the access policy assigned to the connection by the policy controller. The access policy is transferred between the policy controller and the target system and is not accessible by the user client or provided by the user client to the target system. The user client is therefore unable to change access policy settings.

The target system communicates with the policy controller to obtain the access policy from the policy controller and/or to validate the connection ID. When the access policy is available to the target system, a connection is established between the target system and the user client. The target system controls the connection and/or user client access to the target system according to the connection-specific access policy.

In this manner, a specific access policy may be assigned and applied to each connection between a user client and a target system. A first connection request from a user client includes a first connection identifier associated with a first access policy, and a second connection request from a user client includes a second connection ID that is different from the first connection ID and associated with a second, different, access policy. As per the invention, the target system operates to apply (e.g. control, restrict, limit, allow) the connections with the requesting user clients according to the corresponding access policy associated with the specific connection ID. That is, the first access policy is applied by the target system to the first connection and the second access policy is applied by the target system to the second connection. When there are multiple connections between the same user client and the target system, a different connection ID is generated for each connection and a different access policy may be applied to each one.

As used herein the term "user client" means an element (such as a computer program running on an endpoint machine) which requests a connection to a target system. Optionally a user client includes a user interface which enables a human user to request and connect to the target system. Optionally, a user client is an application acting independently of a human user which requests connections to a target system.

As used herein the terms "target system" and "target device" mean a computing device which can connect to the user client and the policy controller. The term "target system" includes applications, systems, servers, proxy servers and other machines, and may reside on an endpoint or be accessible over a communication network. The target system may contain residing and running applications and services, an operating system, a memory, and other storage components and memory and/or computing resources.

As used herein the term "access policy" means settings which are used by the target system to control a connection with a user client. The access policy settings may be used to establish communication with the user client machine and/or maintain the connection between the user client machine and/or specify permitted user actions during the connection. Optionally, the connection ID is time-limited and is valid only for a specified time period.

As used herein the term "determines an access policy" and similar terms mean selecting or identifying the desired policy for a specific requested connection. The selection is optionally rule-based for parameters such as the user client, target system, type of connection requested and so forth.

As used herein the term "connection" means the respective communication between the user client and the target system and the events and/or activities occurring on the target system in response to user client actions upon the target system.

As used herein the term "connection settings" means settings that are provided to the user client, for use by the user client with a connection request sent to a target system to establish a new connection (e.g. communication session). The connection settings include the connection ID. These settings vary between protocols and may include different parameters that are indicative of the originating user client and requested connection or task. For example, in RDP the connection settings may include the window resolution, username, domain, clipboard redirection, printers redirection and, drives redirection.

As used herein the term "access policy settings" means a set of rules and/or parameters used by a target system to control a specific connection. For example, in RDP protocol, the access policy settings may comprise redirection clipboard parameters, redirection printers parameters, redirection drivers parameters, encryption level parameters (e.g. to define the minimal encryption level allowed) and other redirection parameters and communication properties.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a simplified network diagram illustrating communication between a user client, a policy controller and a target system, according to embodiments of the invention. For clarity, FIG. 1 shows a single user client 120 running on client machine 110 establishing a connection to a single target system 140. However, in typical embodiments the network connects multiple user clients to multiple target systems. Policy controller 130 serves as a trusted third party to establish access policies for connections between user clients and target systems. Optionally, a client machine or endpoint hosts multiple user clients.

A connection between a user client and a target system includes one or both of:

i) A communication session between the user client and the target system; and ii) User client access to target system resources.

For example, user 120 client running on client machine 110 may connect to a server (i.e. target system) with RDP. Once the communication session is established, the user client may run applications, store data and retrieve data from the server, etc.

Connection settings are provided by policy controller 130 to user client 120. The connection settings are used by user client 120 to establish the connection with the target system.

The access policy includes settings that are assigned per connection, and are applied to the connection by target system 140. The access policy may be used by target system 140 to establish the communication session with the user client and/or be used by target system 140 to control user client access and usage of target system resources.

Optionally, the access policy settings are in the form of a set of settings and parameters, such as permission access parameters, connection properties, and other parameters, defined per connection to a target system. The access policy settings may define which abilities of the protocol are enabled (e.g. RDP clipboard redirection), rules that determine when the connection may be established (e.g. connection could not be established at specific hours) and other settings that are relevant for a specific protocol.

Optionally the access policy uses the same format as the connection protocol. For example, for a RDP connection the access policy is provided by policy controller 130 to target system 140 as an RDP file. Alternately or additionally, the access file uses a different or special purpose format known to policy controller 130 and target system 140, and does not conform to the connection protocol.

Optionally, the access policy specifies whether the connection ID is or is not valid only for the client machine that requested the connection settings from policy controller 130.

If valid for other client machines, the connection ID may be forwarded to a different client machine which connects to target system 140 using the forwarded connection ID.

The communication flow is as follows:

[1] User client 120 sends policy controller 130 a request for connection settings to connect to target system 140. The user client request specifies the target system and may also include additional information used by policy controller 130 to determine an access policy for the connection. Information provided by user client 120 to policy controller 130 may include one or more of:

i) User information, such as username, password and permissions;

ii) User client information—such as the type of endpoint, applications running on user client 120 and version information;

iii) Client machine information—such as supported communication protocols, encryption and encoding capabilities; and iv) User preferences for the connection—such as the IP address of the client machine that will establish the connection, preferred encryption key size.

[2] Policy management logic 150 on policy controller 130 generates a unique connection identifier and associates an access policy with the connection. Policy management logic 150 is operative in response to the user client request for connection settings to analyze the data provided with the request in order to determine the access policy to be applied to the connection. The user preferences, if specified, may be accepted or rejected. Connection settings which include the connection ID are sent to user client 120.

Optionally, policy management logic 150 extracts relevant data from the connection settings request and builds the respective access policy using the data extracted from the request. For example, policy management logic 150 may look up user privileges using the username included in the connection settings request and build an access policy which limits user client access to target system resources (such as a database or application) during the connection. Since the access policy is determined on a per connection basis, the same user client may be allowed different or unlimited access to target system resources for a second connection to the same target system.

The policy controller logic 150 may associate the access policy at various stages of establishing the connection. Optionally, for a particular connection, policy controller logic associates the access policy at one of:

i) Upon receiving the connection settings request from the user;

ii) Upon receiving a request for the access policy from target system 140;

iii) Upon receiving a message from user client 120 or target system that the connection is being established.

Policy controller logic 150 is also operative to generate a connection ID that provides the desired level of security, such as a globally unique identifier (GUID), The connection ID may be valid for a limited time period (e.g. 1 minute), and will not be accepted by target system 140 and/or authenticated by policy controller 130 if the time period between issuing the connection ID and connecting to target system 140 is exceeded.

Connection settings which include the connection ID are provided by policy controller 130 to user client 120. The connection settings may vary between protocols and may include different parameters (e.g. specified settings, protocol used to define the settings, etc.) may vary for different user clients and/or different types of connections.

For example, in RDP the connection settings may include the window resolution, username, domain, clipboard redirection, printers redirection, and drives redirection. In SSH the connection settings may indicate whether port forwarding is permitted and a file transfer protocol.

[3] Communication with target system 140 is initiated by user client 120 using the connection settings. The user client request to establish a connection (denoted a connection request) specifies the connection ID to target system 140, and may include other data provided by user client 120 (such as password and/or authorization level).

[4] Optionally, target system 140 requests the access policy for the connection ID from policy controller 130 and/or to authenticate the connection ID.

[5] Policy controller provides the access policy for the connection to target system 140.

Connection management logic 160 on target system 140 is configured to apply the access policy settings on the connection established with user client 120 and to manage the connection between user client 120 and target system. Specifically, target system logic 160 is operative in response to a request for a connection from user client 120 to determine a connection-specific access policy for the respective connection with user client 120 and to apply the access policy to the connection.

Optionally, the access policy is applied by one or more of:

i) Enforcing rules defined by the access policy (e.g. types of actions permitted to the user);

ii) Establishing the communication session with specified parameters (e.g. encryption key length, security protocol, communication protocol etc.); and iii) Applying specified settings to applications running on target system 140.

Optionally, target system logic 160 modifies the access policy prior to applying it to the connection. For example, the access policy defined by policy controller 130 may allow a user unlimited access to a database, but target system logic 160 may limit user access to certain times of day or access frequency. Target system logic 160 may apply rule-based logic based on data provided with the user request and/or internal settings.

Optionally, target system logic 160 updates the access policy dynamically during the connection, based, for example, on user actions during the session, time of day and/or current demand for target system resources.

In order to ensure that the access policy is applied per-connection, the connection ID is limited to a single use. The policy controller and/or target system monitor connection requests in order to determine when multiple connection requests are made with the same connection ID. Optionally, when a connection request is received by a target system, target system 140 provides the connection ID to policy controller 130. Policy management logic 150 monitors the list of connection IDs received from the target systems, and issues an alert when a connection ID is used more than once. Target system 140 may take a specified action when an alert is received, for example block or terminate any connections originating from the same client machine or having the same username.

In some embodiments, a user client resides on an endpoint device. Alternately or additionally, a user client resides on a central server serving multiple user clients.

The policy controller may reside on one of:

i) a server functioning as a proxy between the user client and target system;

ii) a machine on which the user client resides; and/or iii) the target system.

Optionally, access policy assignment is performed by a single policy controller. In alternate embodiments, the policy controller is distributed over the network.

Establishing Connections

Following are exemplary embodiments of establishing a connection between a user client and a target server.

Optionally, connections between user clients and target systems are established in one or more of the following ways:

i) Direct connection between the user client and the target system—The user client sends the connection request and the connection ID to the network address of the target system. The target system network address may be known to the user client before requesting access to the target system. Alternately, the user client sends the name (or other logical indicator) of the target system to the policy controller with the request for connection settings from the policy controller, and the target system network address is provided to the user client as part of the connections settings. The target system uses the connection ID to identify an associated access policy stored on the target system and/or to obtain the access policy from the policy controller.

ii) Connection via a proxy server—The user client sends the connection request and the connection ID to the network address of a proxy server. The proxy server operates similarly to the target system and uses the connection ID to determine the associated access policy, and applies some or all of the settings and/or restrictions specified by the policy. For example, the proxy server may forward the connection to the target system using the encryption protocol specified by the access policy.

Optionally, when the connection request does not include the network address of the target system, the proxy server sends the connection ID to the policy controller and requests the target machine address. The connection is established via the proxy server to the target system. The target system may also apply the access policy to the connection, in addition to the actions taken by the proxy server when establishing and/or maintaining the connection.

iii) Connection via a route determined by the policy controller—The user client sends the connection request to a first proxy (or other network element capable of routing data through a network) at an address provided by the policy controller as part of the connection settings. The proxy determines the route for the connection from the connection settings, for example according to rules applied to the connection settings and/or the connection ID, and/or by requesting routing instructions from the policy controller. The connection is established via multiple proxies, and each proxy in the route uses the connection ID to determine the connection route and apply the relevant access policies. The target system may also apply relevant aspects of the access policy, in order to control operations at the target system but not the connection routing.

The exemplary embodiments above are not limiting. Other embodiments are possible for different system configurations, system environments and so forth.

Figure 2:
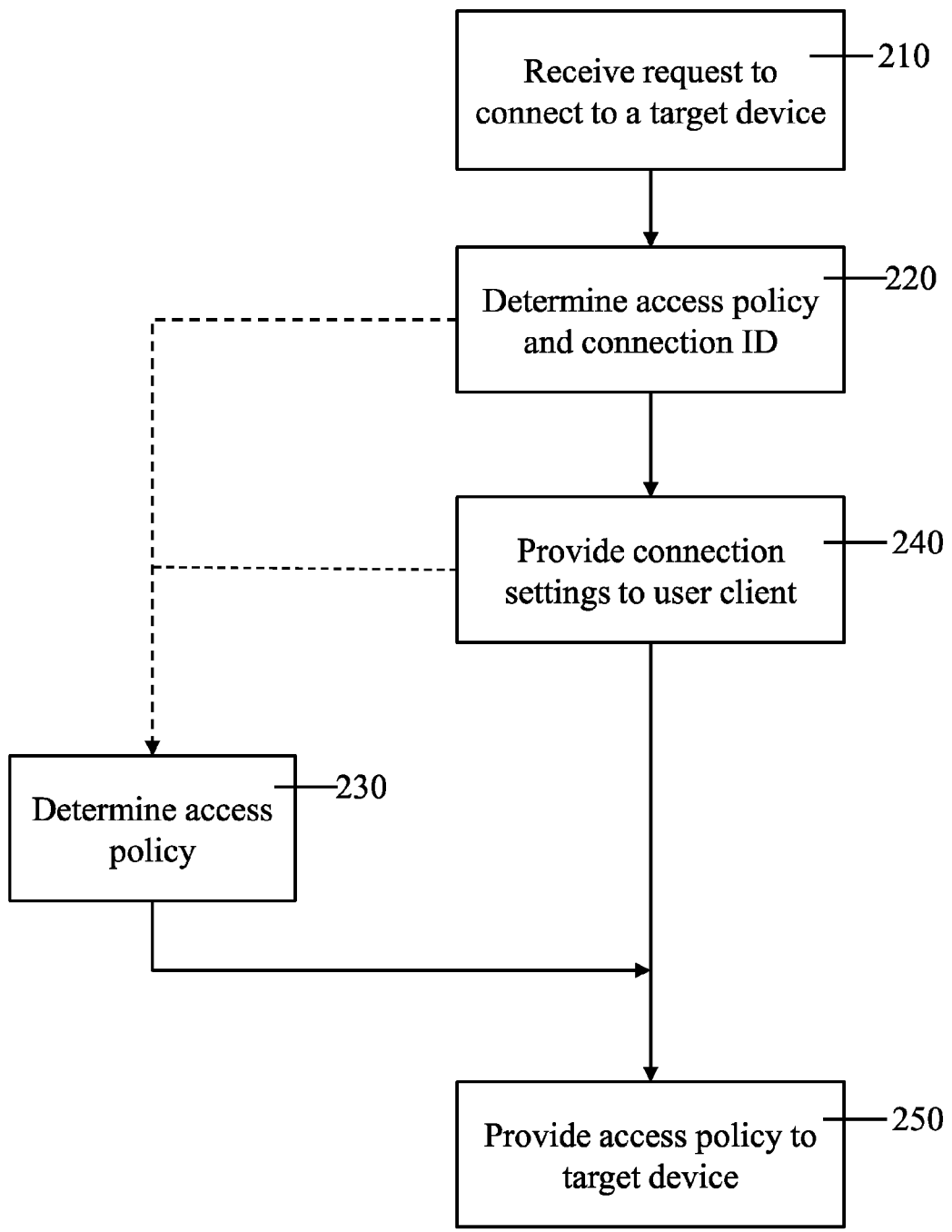
FIG. 2 is a simplified flowchart of a method of managing a connection-specific policy for accessing a target system, according to embodiments of the invention.

Reference is now made to FIG. 2, which is a simplified flowchart of a method of managing a connection-specific policy for accessing a target system according to embodiments of the invention. In some embodiments, the method is performed by the policy controller.

In 210, a request from a user client to establish a connection with a target system is received.

In 220, a respective connection ID is assigned to the connection.

In 230, an access policy determined and associated with the connection ID. As described above, this may occur at different stages of the method, as indicated by the dashed arrows into 230.

Optionally multiple access policies are predefined on the policy controller, and the policy controller selects one of the predefined access policies for the connection. Alternately or additionally, access policy settings are specified independently for each requested connection.

Optionally, the access policy specifies connection parameters and/or operation parameters for the target system. Examples of connection parameters include: encryption type, packets sizes, protocol and routing. Examples of operation parameters include: file operations, access to resources and operations on operating system.

In 240, connection settings including the associated connection ID are provided to the user client. The connection settings are used by the user client to establish the connection with the target system.

As described above, the access policy typically includes a set of settings and parameters. Each parameter may be provided in ways conforming to the capabilities of the policy controller and target system. Examples include: as a file, a script, via any of the specified properties of the communication protocol or in any other way and/or format known in the art.

Optionally, the connection settings specify a routing of the connection established with the connection identifier.

Optionally, the connection ID is a unique string (such as a GUID) that may not be derived or identified from the connection request while it is valid.

Optionally, the connection settings and connection ID are provided to the user client separately.

In 250, the access policy associated with the connection identifier is provided to the target system. The target system is thus able to apply a specific access policy on a connection established for a request containing the connection ID.

Optionally, the access policy is provided to a target system in push mode. In push mode the policy controller sends the access policy and corresponding connection ID to the target system autonomously, without receiving a request from the target system.

The policy controller optionally stores the access policy in a database referenced by the connection ID. Optionally the database stores additional data for the connection ID, such as the user client, target system, when the connection was established and/or data provided by the target system about user actions during the connection.

When a connection request is received, the target system uses the connection ID to retrieve the associated access policy from the lookup table. Optionally, if the connection ID is not present in the lookup table, the policy controller issues an alert to the target system.

Alternately or additionally, the access policy is provided to the target system in pull mode, in which the target system requests the access policy associated with a specified connection ID.

In yet another additional or alternate embodiment, the access policy is provided as part of regularized polling of the policy controller by the target system. The target system sends the policy controller a command to send all connection identifiers issued to user clients since the last polling request (or other time period). The policy controller returns a list of connection identifiers (and optionally associated access policies) to the target system.

Figure 3:
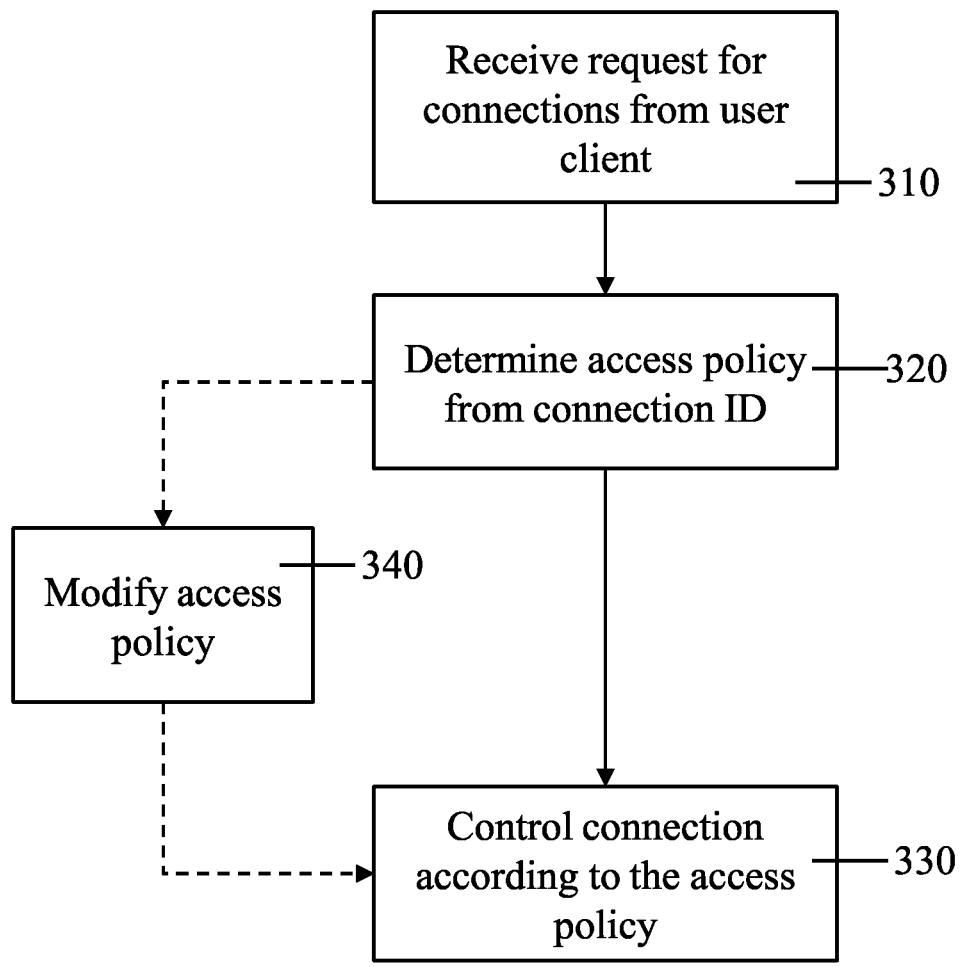
FIG. 3 is a simplified flowchart of a method of applying a connection-specific access policy, according to embodiments of the invention.

Reference is now made to FIG. 3, which is a simplified flowchart of a method of applying a connection-specific access policy, according to embodiments of the invention. In some embodiments, the method is performed by the target system.

In 310, requests for connections are received from user clients. Each connection request specifies a respective connection identifier issued to the user client by a policy controller. The connection ID is unique to each request.

In 320, the connection ID is used to obtain the access policy for the connection. Optionally, the access policy is received from a network element (e.g. policy controller) along with the associated connection ID. Alternately, the access policy is obtained by querying a network element for the access policy specified for the connection ID.

In 330, the connection is controlled based on the respective access policy. Optionally, controlling the connection includes apply the access policy to control the connection. Controlling the connection may include one or more of: restricting the connection to a set of allowable connection properties, access parameters, and other settings.

Optionally, in 340 the access policy is modified prior to establishing the connection with the user client and/or during the course of the connection. After the access policy is obtained from the policy controller, data relating to the connection is collected and rules are applied to the access policy to change access policy settings if desired. The data may be collected, for example, by extracting data from the connection request (e.g. domain) and/or be requested or provided by external system elements (e.g. administrator update to user client privileges on the target system) and/or derived by the target system itself (e.g. by monitoring and analyzing user client activities during previous connections).

Optionally, the access policy modification is based on data including, but not limited to, one or more of:
  i) Originating source IP;
  ii) Originating domain;
  iii) The time of the connection;
  iv) Username;
  v) Client version;
  vi) Supported encryption level;
  vii) User client actions during the connection; and
  viii) Data provided by other network elements during the connection.

In non-limiting embodiments of the invention, the connection between the user client and the target system is over an RDP communication channel employing remote desktop settings. Alternate or additional embodiments may employ other types of connection protocols and utilize other types of connection settings, including HTTP, SSH, SSL, and operate in other system environments.

Policy Controller

In some embodiments of the invention, a policy controller for managing a connection-specific access policy includes an interface and a processing unit. User client requests for connection settings are input through the interface. The processor performs the processing tasks necessary for policy controller operation. These tasks include:
  i) Receiving a request from a user client to establish a connection with a target system;
  ii) Determining an access policy for the connection and associating the access policy with a connection identifier;
  iii) Providing the connection settings which include the connection identifier to the user client; and
  iv) Providing the access policy for the connection identifier to the target system.

Optionally, the policy controller pushes the access policy and the associated connection identifier to the target system. Alternately or additionally, the policy controller operates in pull mode, by returning the access policy to the target system in response to a query from a target system for a specified connection ID.

Optionally, predefined access policies are stored on the target system. The policy controller identifies the access policy to the target system by selecting one of the predefined policies and does not need to supply specific access policy settings.

Optionally, the policy controller designates an alternate target system for a connection, and provides the user client with connections settings to the alternate target system. For example, the user client may request access to an application running on a specified server, and the policy controller may provide the user client with settings (such as IP address) to a second server running the same application. Thus the connection is established to a different (i.e. not requested) target system, typically in a way that is transparent to the operation of the user client.

Optionally, the connection settings specify a routing of the connection between the user client and the target system.

The policy controller includes policy management logic which is configured to perform one or more of:
  1) Generate or obtain a unique identifier for the connection;
  2) Determine an access policy for the connection;
  3) Provide connection settings to the user client;
  4) Provide the access policy to the target system;
  5) Extract data from the connection settings request;
  6) Store and manage data relating to the connection ID, associated access policy and the connection; and
  7) Monitor and/or audit connections established with connection IDs.

Optionally the policy controller includes a memory configured to store data including connection IDs and associated access policy and/or parameters used by the policy management logic to determine or define an access policy for a connection.

Target System

In some embodiments of the invention, a target system applying connection-specific access policies includes an interface and a processing unit. User client requests to connect to the target system are input through the interface. The connection requests specify the respective connection IDs (which were provided to the user clients by the policy controller). The processor performs the processing tasks necessary for controlling the connection based on the access policy.

These tasks include:
  i) Determining the access policy using the connection identifier; and
  ii) Controlling the connection according to the determined access policy.

The access policy may be pushed or pulled to the target system.

Optionally, the target system modifies the access policy during the connection with the user client.

Optionally, the target system resides on a proxy server connecting between the user client and a destination device and applies the access policy to a connection between the user client and the destination device.

Optionally, the target system authenticates the connection ID with the policy controller.

The target system includes target system logic which is configured to apply the access policy settings on the connection established with the user client and to manage the connection between the user client and target system. The target system logic may be rule-based, in which a set of rules and logical operations are applied to settings and parameters provided with the connection request and/or access policy in order to determine actions that should be performed by the task manager.

The target system optionally includes a memory which stores the access policy in a lookup table based on the connection ID. When a connection request is received, the target system uses the connection ID to retrieve the associated access policy from the lookup table. Optionally, if the connection ID and/or access policy are not present in the lookup table, the target system requests the access policy from the policy controller.

Optional embodiments of the invention apply additional mechanisms for controlling aspects of a connection with a connection-specific access policy as described herein.

I) User Provisioning

In a first exemplary embodiment, a connection is not established until the user client requesting the connection has been provisioned for accessing the target system.

Further optionally, the user client is provisioned on the target system as follows. The user client provisioning utilizes three credential sets: authentication credentials, privileged credentials and provisioned credentials. An intermediate element (such as a proxy server) receives or is notified of a request from the user client to establish a connection with the target system. The request includes authentication credentials. The intermediate element creates provisioned credentials using privileged credentials which are authorized for creating provisioned credentials for accessing the target system. Once provisioned credentials have been created, a dual session communication channel is established between the user client and the target system. The connection between the user client and intermediate element is established using the authentication credentials and the connection between the intermediate element and the target system is established using the provisioned credentials. The provisioned credentials are not provided to the user client.

Thus for the target system, the connection is established in effect with a user client having access permissions defined by the provisioned credentials. The target system controls the connection based on a combination of the access policy and user provisioning as defined by the provisioned credentials.

Optionally, provisioned credentials are created for a specific connection, associated with the corresponding connection ID and registered with the target system.

II) Privileged Account Management System

In a second exemplary embodiment, a privileged account management system (PAMS) is used for authentication, connection monitoring and auditing, password management and/or other account management functions for the connection. A PAMS is a solution for managing privileged accounts. PAMS hold the credentials for the privileged account and a mapping of users (such as administrators) to permitted accounts, according to a policy defined by the organization. Optionally the PAMS is used for one or more of:

i) Authenticating the user client to the policy controller;
   ii) Authenticating the connection identifier;
   iii) Authenticating the policy manger to the target system; and
   iv) Serving as a repository for access policies, accessible to the policy controller and/or target system.

III) RDP

In a third exemplary embodiment a policy controller provides connection-specific access policies for a connection between an RDP user client (MSTSC) and an RDP terminal server (i.e. target system).

In RDP, the terminal server applies the access policy over the connection. Typically, access policies are determined by the client settings and/or RDP listener settings and/or group policy. In this exemplary embodiment, the terminal server uses a customized Remote Desktop Protocol Provider to override the default policies with an access policy provided by the policy controller at the connection level.

In order to establish a connection with a terminal server, the RDP client obtains all the relevant settings for the connection and a connection ID from the policy controller. The settings are provided by the policy controller to the RDP client in the RDP file format. Optionally, the policy controller provides the RDP file to the MSTSC with a web server and the MSTSC uses the downloaded RDP file the initiate the connection with the terminal server.

RDP file format is a text file containing settings in a key:type:value format. An example of an RDP connections settings file which may be provided by the RDP client to the terminal server is:

full address:s:10.10.24.48 [Target machine address]
   server port:i:3389 [Target machine port]
   username:s:60fe7b93-9edc-4315-8341-477ab8c2934f [Connection ID]
   desktopwidth:i:1024 [Window width]
   desktopheight:i:768 [Window height]
   redirectdrives:i:0 [Drives redirection]
   redirectsmartcards:i:0 [Smartcard redirection]
   redirectcomports:i:0 [COM ports redirection]
   redirectclipboard:i:0 [Clipboard redirection]
   use multimon:i:0 [Multiple monitors usage]

Other RDP policy settings may include: window resolution, domain and printers redirection.

The access policy is optionally provided by the policy controller to the target system as an RDP file, with the fields and settings conforming to the access policy.

For each new connection, the terminal server extracts the connection ID from the RDP file provided by the client. For example, the connection ID may be part of the username. The terminal server uses the connection ID to retrieve the relevant access policy from the policy controller. Then the terminal server overrides the effective policy for the connection with the access policy retrieved from the policy controller.

The above-described embodiments control connections between user clients and target systems with connection-specific access policies. The connection ID is provided by the user client with the connection request. The connection ID serves as a unique identifier which is used by the target service to obtain an access policy for a specific connection.

It is expected that during the life of a patent maturing from this application many relevant user clients, target systems, target devices, servers, networks, identifiers, access policies, policy settings, connection settings, connections and protocols will be developed and the scope of the terms user client, target system, target device, server, network, identifier, access policy, policy setting, connection setting, connection and protocols is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of managing a connection-specific policy for a communication request, comprising:
   executing, at a policy controller, by at least one hardware processor of at least one server:
   receiving, over a network from a client machine running a user client application, a request for a connection with a target system; and
   in response to said request:
     determining, from an analysis of data included in said request, an access policy for use by said target system to control a specific connection with said user client application running on said client machine;
     generating a connection identifier unique to said specific connection;
     providing said connection identifier, over said network, to said user client application via said client machine;
     providing, to said target system over said network, said access policy for said specific connection, so as to allow said target system to control said specific connection with said user client application running on said client machine according to said access policy; and
     dynamically modifying said access policy during said specific connection by applying logical rules to data comprising at least one of: user client actions during said connection, time of day and current demand for target system resources,
   wherein said access policy specifies operation parameters for said target system.

2. A method according to claim 1, wherein said access policy specifies connection parameters for said specific connection.

3. A method according to claim 1, wherein access policies are predefined on said target system, and providing said access policy comprises identifying to said target system an access policy associated with said connection identifier.

4. A method according to claim 1, wherein said providing said access policy comprises sending said access policy to said target system.

5. A method according to claim 1, further comprising selecting an alternate target system for said specific connection and providing, to said client machine, connection settings to connect said user client application running on said client machine to said alternate target system, said access policy being provided to said alternate target system.

6. A method according to claim 1, wherein said connection settings specify a routing of said specific connection.

7. A method according to claim 1, wherein said data included in said request comprises a combination of a characteristic of a user client application originating said request on said client machine and a characteristic of said target system.

8. A method according to claim 1, wherein said access policy specifies permitted actions by said user client application on said target system during said specific connection.

9. A method according to claim 1, further comprising executing, at a target system, by at least one hardware processor:
   receiving, over a network from said client machine, a request for said specific connection, said request comprising said connection identifier;
   obtaining said access policy from said policy controller based on said connection identifier;
   establishing said specific connection with said client machine; and
   limiting user client actions during said specific connection to said permitted user client actions specified by said access policy.

10. A method of applying a connection-specific policy by a target system, said method comprising:
    executing, at a target system, by at least one hardware processor of at least one server:
    receiving, over a network from a client machine, a request for a connection, said request specifying a connection identifier unique to said request;
    using said connection identifier, obtaining, over said network from a policy controller communicating with said target system, an access policy for establishing a specific connection with a user client application running on said client machine;
    establishing said specific connection with said user client application running on said client machine according to connection settings permitted by said access policy;
    controlling activity between said user client application and said target system during said specific connection in accordance with said access policy; and
    dynamically modifying said access policy during said specific connection by applying logical rules to data comprising at least one of: user client actions during said connection, time of day and current demand for target system resources, wherein said access policy specifies operation parameters for said target system.

11. A method according to claim 10, wherein said access policy specifies connection parameters for said specific connection.

12. A method according to claim 10, wherein said obtaining said access policy comprises:
sending a request to said policy controller for an access policy for said connection identifier; and
receiving said access policy from said policy controller.

13. A method according to claim 10, wherein said analyzed data comprises a combination of a characteristic of a user client application originating said request on said client machine and a characteristic of said target system.

14. A method according to claim 10, wherein said access policy specifies permitted actions by said user client application on said target system during said specific connection.

15. A policy controller for managing a connection-specific access policy, comprising:
an interface adapted to communicate over a network; and
a hardware processing unit of at least one server, connected to said interface and adapted to:
receive, over said network from a client machine running a user client application, a request for a connection with a target system; and
in response to said request:
determine, from an analysis of data included in said request, an access policy for use by said target system to control a specific connection with said user client application running on said client machine;
generate a connection identifier unique to said specific connection;
provide said connection identifier, over said network, to said user client application via said client machine;
provide, to said target system over said network, said access policy for said specific connection, so as to allow said target system to control said specific connection with said user client application running on said client machine according to said access policy; and
dynamically modify said access policy during said specific connection by applying logical rules to data comprising at least one of: user client actions during said connection, time of day and current demand for target system resources,
wherein said access policy specifies operation parameters for said target system.

16. A policy controller according to claim 15, wherein said access policy specifies at least one of: connection parameters for said specific connection and operation parameters for said target system.

17. A policy controller according to claim 15, wherein said processor is further configured to push said access policy to said target system over said network.

18. A policy controller according to claim 15, wherein said processor is further configured to provide said access policy to said target system in response to an access policy requested received from said target system and comprising said connection identifier.

19. A policy controller according to claim 15, wherein said processor is further configured to select an alternate target system for said specific connection and send said access policy to said alternate target system.

20. A policy controller according to claim 15, wherein said connection settings specify a routing of said specific connection.

21. A policy controller according to claim 15, wherein said policy controller resides on a server functioning as a proxy between said client machine and said target system.

22. A policy controller according to claim 15, wherein said processor is further configured to authenticate said request with a privileged account management system (PAMS).

23. A target system with connection-specific access policies, comprising:
an interface adapted to communicate over a network; and
a hardware processing unit, connected to said interface and adapted to:
receive, over said network from a client machine, a request for a connection, said request specifying a connection identifier unique to said request;
using said connection identifier, obtain, over said network from a policy controller communicating with said target system, an access policy for establishing a specific connection with a user client application running on said client machine;
establish said specific connection with said user client application running on said client machine according to connection settings permitted by said access policy;
control activity between said user client application and said target system during said specific connection in accordance with said access policy; and
dynamically modify said access policy during said specific connection by applying logical rules to data comprising at least one of: user client actions during said connection, time of day and current demand for target system resources,
wherein said access policy specifies operation parameters for said target system.

24. A target system according to claim 23, wherein said processor is further configured to dynamically modify said access policy during said specific connection.

25. A target system according to claim 23, wherein said target system resides on a proxy server connecting between said client machine and a destination device, and said target system applies said access policy on a connection between said user client application running on said client machine and said destination device.

26. A target system according to claim 23, wherein said processor is further configured to authenticate said connection identifier with said policy controller.

* * * * *